Aug. 5, 1930.  H. B. AVAKOFF ET AL  1,772,200
NUT LOCK
Filed Aug. 19, 1929
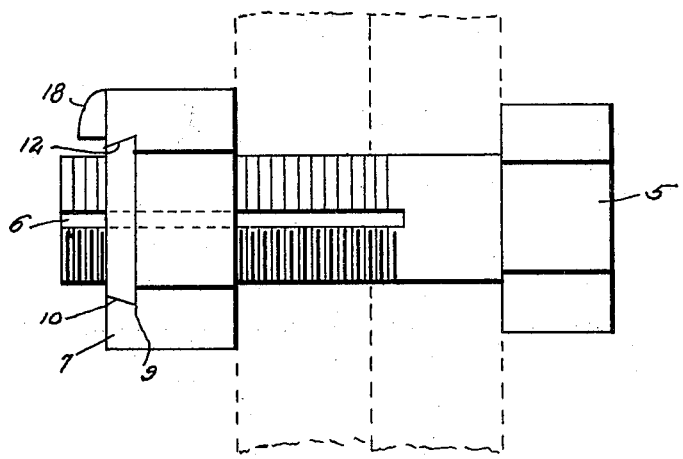
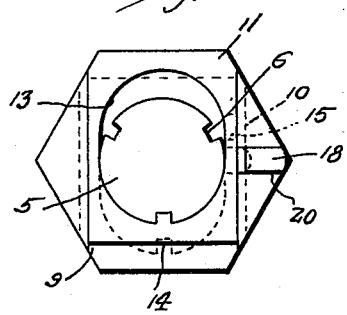
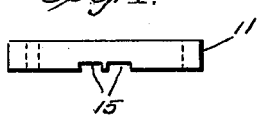
Inventor
Harry B. Avakoff,
Lorenz Thimme,
By Clarence A. O'Brien
Attorney Patented Aug. 5, 1930

1,772,200

UNITED STATES PATENT OFFICE

HARRY B. AVAKOFF AND LORENZ THIMME, OF FAIRBANKS, TERRITORY OF ALASKA; SAID THIMME ASSIGNOR TO SAID AVAKOFF

NUT LOCK

Application filed August 19, 1929. Serial No. 386,930.

This invention relates to certain new and useful improvements in devices for locking a nut to the shank of a bolt so as to prevent accidental rotation of the nut on the bolt.

Another very important object of the invention is to provide a device of this nature wherein the bolt has a shank provided with a longitudinally extending groove and a nut adapted to be threaded on the bolt, said nut being provided with a slide having a projection formed thereon adapted to be moved into and out of engagement with any one of the grooves for maintaining the nut in locked position upon the bolt.

Another very important object of the invention resides in the provision of additional means for maintaining the slide in locked engagement with the bolt so as to prevent undue accidental movement of the slide out of engagement with the bolt.

Another very important object of the invention is to provide a device of this nature which is simple in construction, consists of but comparatively few parts, is strong, durable, positive and efficient in operation, practical, reliable, and otherwise well adapted for the purpose designed.

Other objects and advantages of the invention will become apparent during a study of the following description taken in connection with the accompanying drawings, wherein:

Figure 1 is a side elevation of a device constructed in accordance with the present invention.

Figure 2 is a vertical fragmentary transverse sectional view, through the bolt and the nut, fully illustrating the manner of locking the slide plate in locked engagement with the shank of the bolt.

Figure 3 is an end view of the device, showing the position of the locked plate prior to its interlocking engagement with the bolt.

Figure 4 is a side edge elevation of the slide plate.

Figure 5 is an end elevation of the dog.

With reference more in detail to the drawings, it will be seen that we have designated the bolt generally by the reference character 5 and that the same has its shank provided with a plurality of longitudinally extending circumferentially spaced grooves 6. The reference character 7 designates generally a nut provided with a central aperture 8, which aperture is internally threaded for adapting the nut to be threaded upon the threaded portion of the shank of the bolt 5. On its outer face, the nut 7 is provided with a groove 9, which groove opens at its opposite end at opposite sides of the nut, as clearly shown to advantage in Figure 3. The side walls of the groove 9 are undercut as at 10, and a substantially rectangular elongated frame or slide plates 11 has its longitudinal sides on their outer faces bevelled as at 12 for slidable reception in the undercut wall of the slot 9. As suggested the frame or slide plate 11 is provided with an elongated opening 13, through which the shank of the bolt may extend, and which at the same time will permit of sliding movement of the plate 11 within the groove of the nut. From one end wall of the slide 11 and projecting inwardly therefrom at the center of the opening 13 formed therein, the slide 11 is provided with a projection 14, which projection 14 is adapted to enter into either of the grooves 6 of the bolt 5, when the slide is slid into the groove for moving the projection 14 toward the shank of the bolt, so that said projection may be received into the adjacent slot 6 of the bolt.

One side wall of the slide 11 on the lower surface of the wall has a pair of notches 15. The purpose of these notches will be hereinafter described.

Extending inwardly from the front face of the nut 7 and having its open end in communication with the slot in said bolt, the nut is provided with a recess or pocket 16. Slidable within the pocket 16 is the shank 17 of a dog 18. A coil spring 19 is located within the pocket, one end of the coil spring bearing against the rear wall of the pocket, the opposite end of the spring bearing against the inner end of the shank 17 of the dog for normally urging the shank outwardly of the pocket and into the slot 9.

It is yet to be mentioned that one wall of the slot 9 is suitably slotted intermediate its ends as at 20 for the reception of the head 18 of said dog. At its head or outer end, the dog is undercut as at 21 to provide a shoulder 23, which shoulder 23 is adapted to engage in any of the notches 15 formed in the side walls of the slide 11 for maintaining said slide immovable within the slot so that when the projection 14 of the slide is seated within any of the grooves 6 of the bolt 5 accidental movement of the slide will be prevented.

Obviously, in order to release the slide, the dog 18 is pushed inwardly against the action of the spring into the pocket 16 so that the shoulder 23 is brought out of engagement with the latch 15, thus permitting a sliding movement of the slide 11 for withdrawing the projection 14 from the groove of the bolt 5.

When the slide 11 has been moved a sufficient distance to withdraw the projection 14 from the slot 6, obviously the dog may be released so that the same may be urged outwardly in order that its shoulder 23 may then engage the other of the slots 15, so that said slide will be held within the slot 9 of the bolt, which at the same time will maintain the slide within the slot with its projection 14 out of engagement with the groove 6 of the bolt, thus permitting the rotation of the nut 7 upon the bolt at the same time that the slide is maintained within the slot 9.

From the foregoing then it is believed that a thorough understanding of the construction, operation and advantages of a nut lock of this nature will be had from the foregoing description when recourse is had to the accompanying drawings.

Even though we have herein shown and described the preferred embodiment of our invention, it is to be understood that the same is susceptible to changes fully comprehended by the spirit of the invention as herein described and the scope of the appended claims.

What is claimed as new is:

1. In a device of the class described, a bolt having a longitudinal groove, a nut adapted to be threaded on the bolt, said nut being provided on one face with a slot, a slide slidable in the slot, said slide having a central recess adapted to receive the adjacent end of the bolt, a projection on the slide adapted for reception in said groove, and means for locking the slide in a predetermined position within said slot.

2. In a device of the class described, a bolt having a plurality of longitudinally extending grooves, a nut adapted to be threaded on the bolt, said nut being provided on one face with a slot, a slide in the slot having a central opening adapted to receive the adjacent end of the bolt, a projection on the slide adapted to be received in either of said grooves, and means for locking the slide in the slot for maintaining said projection seated within the groove of the bolt.

3. In a device of the class described, a bolt having a plurality of longitudinally extending grooves, a nut adapted to be threaded on the bolt, said nut being provided on one face with a slot, a slide slidable in said slot and having a central aperture adapted to receive the adjacent end of the bolt, a projection formed on the slide adapted to engage in any of said grooves, said slide being provided on one side thereof with notches, and a dog carried by the nut and adapted for reception in either of said notches for locking said slide in a predetermined position within said slot.

4. In a device of the class described, a bolt having a plurality of longitudinally extending grooves, a nut adapted to be threaded on the bolt, said nut being provided at one face with a slot, a slide slidable in said slot and having a central aperture adapted to receive the adjacent end of the bolt, a projection formed on the slide adapted to engage in any of said grooves, said slide being provided on one side thereof with notches, and a dog carried by the nut and adapted for reception in either of said notches for locking said slide in a predetermined position within said slot, and spring means for yieldably retaining said dog in engagement with said notches in the slide.

5. In a device of the class described, a bolt having a plurality of longitudinally extending grooves formed therein, said grooves being arranged on the bolt in circumferential spaced relation, a nut adapted to be threaded on said bolt, said nut being provided on one face with a slot, a slide operable in the slot, said slide having a central aperture adapted to receive said bolt, a projection carried on the slide adapted to engage in either of said grooves, said nut being provided with a pocket communicating with said slot, a spring pressed dog slidable in said pocket and adapted to be moved outwardly toward said slot, said slide being provided with notches, and said dog adapted to engage in the notches for maintaining the slide in locked engagement with the bolt or in an unlocked engagement with the bolt to permit rotation of the nut upon the said bolt, as and for the purpose specified.

In testimony whereof we affix our signatures.

HARRY B. AVAKOFF.
LORENZ THIMME.